FIG. 2

Jan. 10, 1967          G. WOLF          3,297,861
DIGITAL MULTIPLICATION AND DIVISION ARRANGEMENT
Filed May 6, 1963                              6 Sheets-Sheet 5

INVENTOR.
Gerhard Wolf
BY Michael S. Striker
Attorney

United States Patent Office 3,297,861
Patented Jan. 10, 1967

3,297,861
DIGITAL MULTIPLICATION AND DIVISION
ARRANGEMENT
Gerhard Wolf, Munich-Pasing, Germany, assignor to
Kienzle Apparate G.m.b.H., Schwarzwald, Germany
Filed May 6, 1963, Ser. No. 278,159
Claims priority, application Germany, May 4, 1962,
K 46,653
11 Claims. (Cl. 235—164)

The present invention concerns an electronic calculator, and more specifically in such a calculator a computer arrangement for serially carrying out line-by-line multiplications and divisions of numbers. It is well known in the art that carrying out multiplications in this manner entails the advantage that a computer handling only one order position at a time is sufficient. On the other hand, for the so-called column multiplication a computer handling at least three orders is required.

A conventional computer for serial operation as mentioned above requires for the operation with two factors of ten orders each a totalizer constituted by a matrix storage having the capacity for storing 20 orders. Consequently, the known computers of this type comprise in connection with the above mentioned matrix storage of 20 order capacity a 20 order driver arrangement (e.g. impulse generator, counting tetrade and switching gates) for reading out and for reintroducing the respective values. Such an arrangement of course entails a rather involved structure composed of a great number of components, particularly in the driver arrangement. A further disadvantage of this system resides in the fact that about one half of the calculating time is wasted with processing excess zeros since continuously all the 20 orders of the matrix storage must be revolved.

It is therefore one object of this invention to provide for a serial computer in which the driver arrangement comprises only one half the number of orders which are provided in the totalizer, and which therefore due to the avoidance of processing excess zeros requires only one half the calculating time as compared with conventional serial computers.

With above object in view the invention includes in an electronic calculator, computer means for serially carrying out line-by-line multiplications and divisions of numbers and comprising, in combination, first factor storing means for storing one calculation factor; second factor storing means for storing a second calculation factor; totalizer storage means cooperating with said first and second factor storing means for carrying out multiplications and divisions, as the case may be, involving said one and said second factors, said totalizer storage means having a capacity for storing $n$ bits of information and being composed of a first and a second partial totalizer storage means each having $n/2$ storage elements for storing calculation results, said first partial totalizer storage means being assigned to the lower significance orders of said numbers, and said second partial totalizer storage means being assigned to the relatively higher significance orders of said numbers; first driver means for driving said first factor storing means; second driver means for driving said second factor storing means; third driver means for driving said totalize storage means and having $n/2$ driver elements; bistable control means cooperating with said third driver means and said totalizer storage means for maintaining operative connection between said third driver means and said first partial totalizer storage means until the capacity thereof is exhausted, and for establishing, when the same is exhausted, operative connection between said third driver means and second partial totalizer storage means; and control means cooperating with one of said factor storing means and with said bistable control means for causing the latter, when the capacity of said one factor storing means is exhausted, to reestablish said operative connection between said third driver means and said first partial totalizer storage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
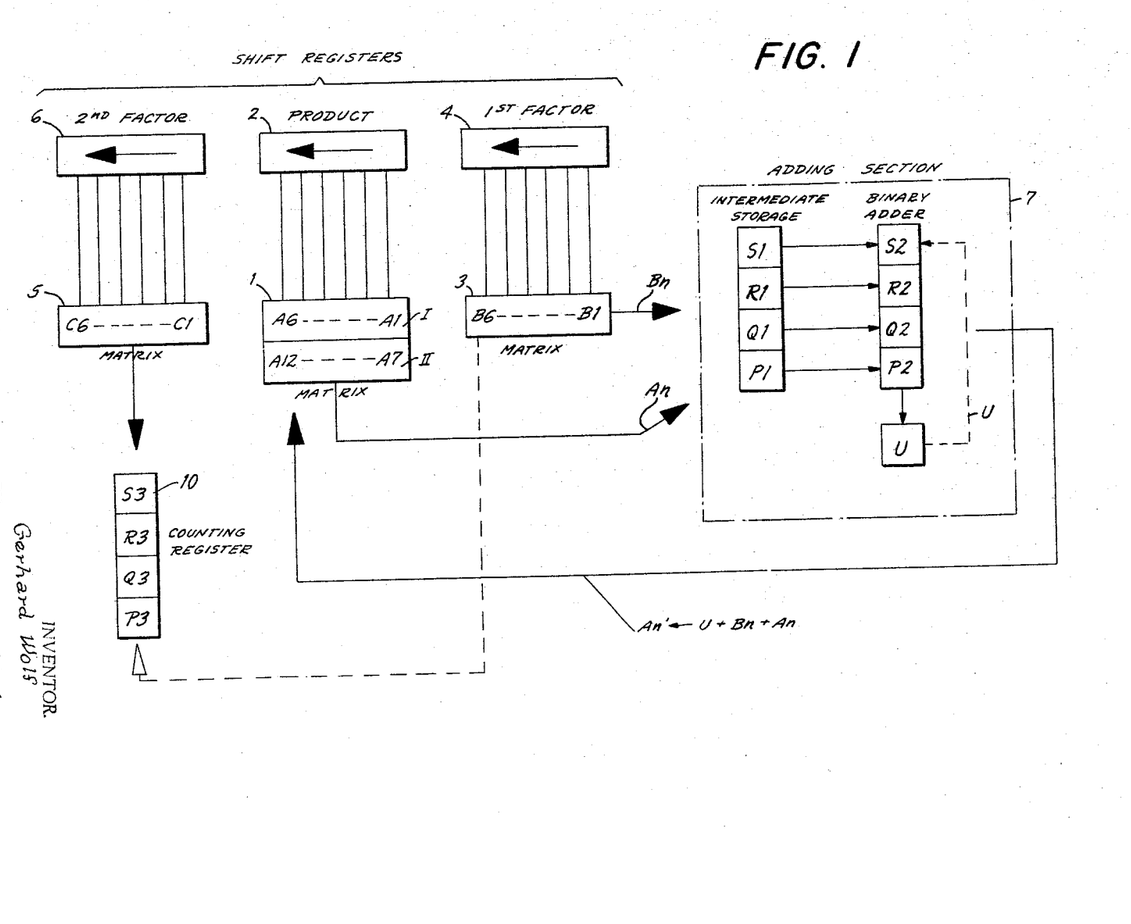
FIG. 1 is a schematic block diagram illustrating a computer arrangement according to the invention.

FIG. 1 illustrates an electronic computer arrangement which can be used for the multiplication of two factors. This computer is a typical serial computer which processes the individual decimal digits (or their binary representations) one after the other through a one-order adder and reinserts the resulting sums into a storage. Since a multiplication involves three components namely the first first factor or multiplicand, the second factor or multiplier, and the product, three groups of storages are provided which are capable of receiving and storing numerical values and transmitting the same separately and independently of each other.

In FIG. 1 a product or totalizer storage 1 is provided which has a capacity corresponding to the sum of the capacities or storage elements of the two factor storing devices 3 and 5, respectively. For actuating the storages 1, 3 and 5 driver arrangements 2, 4 and 6, respectively are provided and correspondingly operatively connected with the storages.

The components 1, 3 and 5 are conventional matrix storages of the general type referred to in U.S. Patents 2,929,050 and 2,915,740. The driver arrangements 2, 4 and 6 are essentially shift registers e.g. of the type referred to in U.S. Patent 2,872,663 including pulse generators for producing half-currents and coupled with an electronic stepping control device. More details about these components and about the operation of the driver arrangements will follow further below in reference to FIG. 2.

In an arrangement according to FIG. 1 a multiplication is carried out as a sequence of additions. Assuming that a first factor is stored in the first factor storing device 3, first one digit of this first factor is transferred into an intermediate storage P1, Q1, R1, S1 and is transmitted from there to an adder P2, Q2, R2, S2. Further below the combination of intermediate storage and adder will be referred to adding section 7. After the first digit of the first factor has been entered into the adder, one digit of whatever number stored in the totalizer storage 1 is also transmitted via the intermediate storage P1–S1 to the adder P2–S2. These two operations are indicated in FIG. 1 by $Bn$ and $An$ since the various storage elements and the respective stored digits in the storing device 3 are designated B1–B6, and similarly the elements and digits in the totalizer storage 1 are designated A1–A12.

The sum of the two digits B$n$ and A$n$ formed in the adder is now reinserted from the adding section 7 into the totalizer storage 1 as indicated by A$n'$. As a rule the sum B$n$ plus A$n$ is transmitted without a carry-over which may appear, but in certain cases described below the carry-over is included in the sum A$n'$. Since the driver arrangements 2 and 4 for the storages 1 and 3 are constructed as stepping shift registers, the operation proceeds by repetition of the above steps so as to sequentially process one digit after the other starting with the digit in the order position of lowest significance. A multiplication is therefore composed of a plurality of such additions.

Theoretically two different procedures may be employed. One procedure would consist in adding repeatedly each individual digit of the first factor as often as is called for by the second factor. However, this would necessitate the use of a three order adder. Therefore the invention provides for another procedure which is based on the fact that only a one-order adder is provided. Thus a multiplication of a first factor with a second factor is carried out in such a manner that a complete multiorder number is repeatedly added as a whole and not digit-by-digit. Thus the procedure is exactly the same as that applying when a multiplication were to be carried out in a plain conventional adding machine.

The adding section 7 is essentially a binary adding device of the type described e.g. in U.S. Patent 2,705,108 or in Richards, "Arithmetic Operations in Digital Computers." Van Nostrand, 1955, page 108, Figs. 4–19. The intermediate storage may consist of a tetrade of flip-flops P1–S1 and the adder may likewise consist of a tetrade of flip-flops P2–S2.

Since in the course of operation the sum of A$n$ and B$n$ is reentered, first without an occurring carry-over, into storage 1 in correct order positions of the indivdiual digits, the number stored at any time in the storage 1 represents the sum of the added digits that were stored in the storages 1 and 3 i.e. of the digits A1–A12 plus the digits B$i$–B6. Whenever a carry-over results from a preceding calculation step, this carry-over is transmitted in the subsequent intermediate step to the adder and thus added to the sum of the next following two digits. Consequently, in such cases a sum A$n'$ constituting the sum of B$n$ and A$n$ plus the carry-over U is transmitted from the adding section 7 to the totalizer storage 1 and is stored therein.

The number of consecutive additions of the first factor or multiplicand is determined through the storage 5 containing the second factor or multiplier.

Each digit of the second factor is transferred in the course of operations into an auxiliary storage 10. This storage 10 may be a tetrade of flip-flops P3, Q3, R3, S3. As will explained further below, the storage 10 is caused to count subtractively stepwise, each step being initiated by a signal from the storage element B6 of storage 3 so that the storage 10 can control in a manner described further below the number of repeated additions and to terminate them when the digit stored in the storage 10 is reduced to 0 by said subtractive counting. Details of these operations will be explained in reference to FIG. 4.

The totalizer storage 1 comprising the orders or storage elements A1–A12 is subdivided into two portions, namely the partial totalizer storage 1 comprising the order elements A1–A6 and the second partial totalizer storage II comprising the order elements A7–A12. This subdivision of the totalizer storage 1 is partly based on the fact that by multiplication of two factors a product is formed, the number of orders whereof is the sum of the numbers of orders of the two factors, e.g. the product will be a 12-order number if there are two 6-order factors. The manner in which the contents of the storages 3 and 5 are synchronously and gradually processed up to the completion of the operation in accordance with the invention will be described further below.

Although it is not shown in FIG. 1 it is obviously necessary to carry out a decimal shift in the course of a multiplication, every time when one digit of the second factor or multiplier is completely processed. It may be mentioned already at this point that the decimal shift is produced by a neutral step in the driver 2 of the totalizer storage 1 and that simultaneously with such decimal shift another digit of the second factor is read out from the storage 5 (C1–C6) and transferred into the counting storage 10 (P3–S3).

Figure 2:
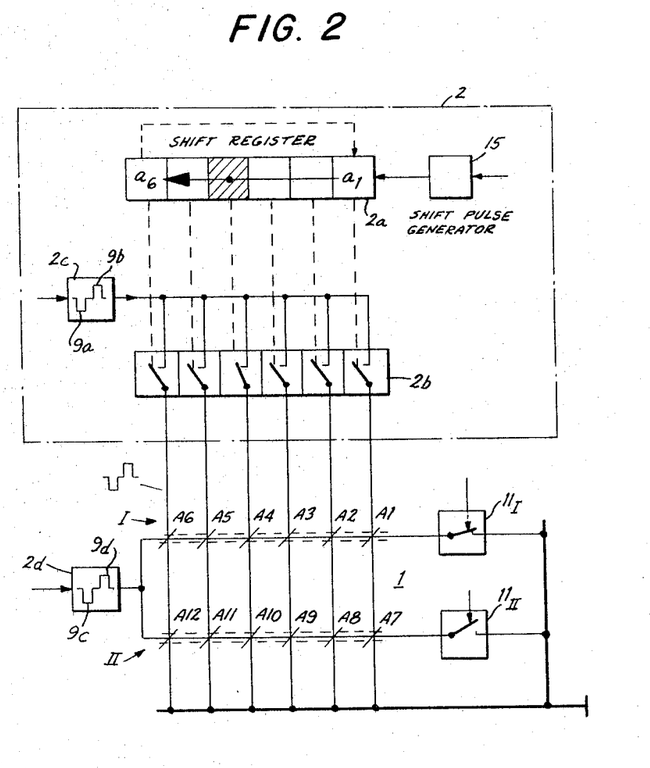
FIG. 2 is a schematic block diagram illustrating certain details of the totalizer contained in FIG. 1.

FIG. 2 illustrates the basic structure of the driver units 2, 4, 6 for the storages 1, 3, 5, respectively, and shows how the two partial totalizer storages I and II are alternatively switched into operative connection with the driver unit 2. In FIG. 2 the driver unit 2 is framed by a dash-dotted line. The driver unit 2 (and in the same manner the units 4 and 6) comprises a shift register 2$a$ which may be composed in a conventional manner of flip-flops a set of conventional electronic switches 2$b$ and a bipolar pulse generator 2$c$ producing alternatingly negative pulses 9$a$ and positive pulses 9$b$. The individual units of the set of electronic switches 2$b$ are individually connected with the elements $a_1$–$a_6$ of the register 2$a$, respectively, so that an output pulse from the individual register element will change the respectively associated electronic switch unit to conductive condition. This means that whenever information stored in the shift register 2$a$ is shifted one step then the correspondingly following electronic switch unit of the set 2$b$ is changed to conductive condition. By way of example, in FIG. 2 one unit of the shift register 2$a$ is shown cross-hatched to indicate that it contains stored information, and the associated switch unit of 2$b$ is shown in closed position. Consequently, by application of shift pulses from a shift pulse generator 15 to the register 2$a$ in synchronism with the output of the bipolar generator 2$c$, one obtains in a sequence progressing from right to left first output impulses 9$a$ and thereafter 9$b$ both applied to the electronic switch units of 2$b$. Depending upon which one of the electronic switch units has been rendered conductive, the impulse 9$a$ is applied to the corresponding storage element of the storage matrix I or II so as to read out whatever was stored in that particular storage element for the purpose mentioned above, and thereafter the impulse 9$b$ causes the above mentioned reinsertion of an addition result A$n'$ as mentioned above.

It should be understood that the output impulses 9$a$ and 9$b$ issued by the driver unit 2 are with respect to their action on the cores of the storage matrices I and II half-currents. These half-currents are complemented to full current strength by the output of a second bipolar generator 2$d$ which applies impulses 9$c$ and 9$d$ to the rows of the storages I and II alternatively but in synchronism with the output of the generator 2$c$. Details of these storage matrices will be described further below.

For controlling the operative connection between the driver unit 2 and the storage matrices I and II in an alternative manner i.e. for determining which one of these two matrices is to be operative under the action of the generator 2$d$, two electronic switches 11$_I$ and 11$_{II}$ are provided of which always one is in conductive condition while the other one is non-conductive. Consequently, $d$ for the particular row or portion of the storage matrix 1 which is activated by the conductivity of one or the other of the switches 11$_I$ or 11$_{II}$ the output impulses from the driver unit 2 result sequentially in the necessary coincidence of half-currents for reading out from, and reinserting into element after element the stored information. In the example illustrated by FIG. 2 the fourth digit A4 is being processed in the corresponding element of the partial totalizer storage I.

In order to better understand the operation of the totalizer storage 1 reference is now made to FIGS. 2$a$–2$e$. The storage matrix of FIG. 2 is a matrix having four planes of which however for the sake of clarity only one is shown in FIG. 2. The use of these four planes is necessitated because a decimal digit is suitably represented by four bits in a binary code. In the serially operating computer according to FIG. 1 the individual decimal digits of a multiorder number are processed completely one after the other digit by digit, however the several bits which constitute the binary code equivalent of the decimal digit are processed in parallel. This means that e.g. the digit A1 and the digit B1 are added in the adding section 7 and the resulting partial sum is reentered into the emptied storage element A1. Hereafter the digits A2 and B2 are added in the adding section 7 and the resulting partial sum is reentered in the element A2. The same procedure follows with the remaining digits and repeats as often as is required in view of a particular digit of the multiplier i.e. as determined by the action of the counting storage 10.

It should be understood that the storages 1, 3 and 5 are storage matrices of the magnetic core type, four cores being provided for each digit, these cores being located in four parallel planes.

Figure 2A:
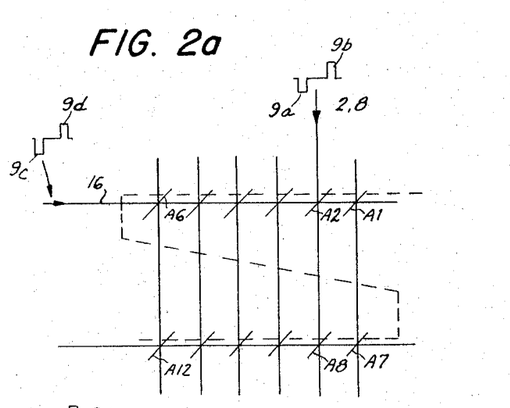
FIGS. 2a–2e are diagrammatic illustrations of details of the totalizer according to FIG. 2.
Figure 2B:
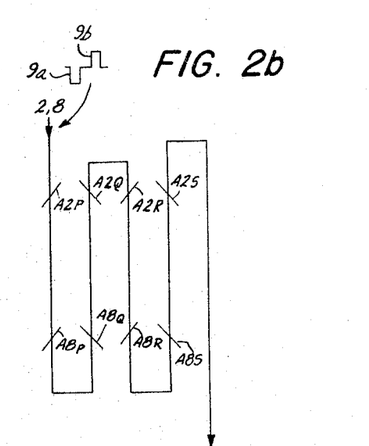
Figure 2C:
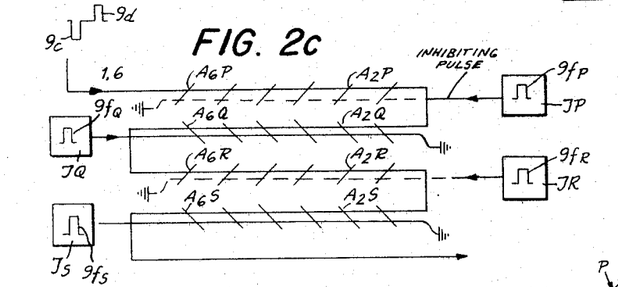
Figure 2D:
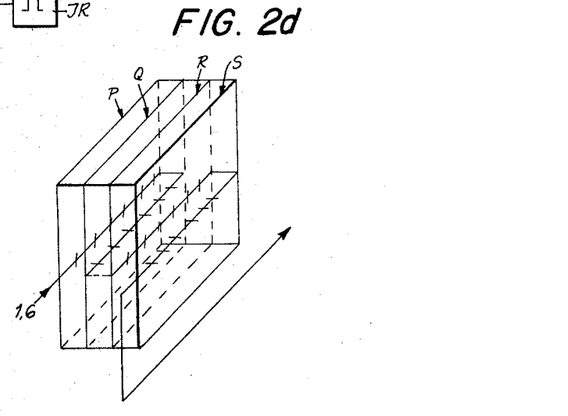

The structure of this type of a matrix will be understood from FIG. 2d showing diagrammatically the matrix in perspective so that the four planes P, Q, R and S are distinguishable. This designation corresponds analogously to that of the flip-flop tetrades S1–P1 and S2–P2 of the adding section 7. The read-out amplifiers of the planes P, Q, R, S influence the intermediate storage P1–S1 and transmit thereto whatever numerical value was stored in the four cores of the respective matrix column. Storage matrices of this general type are referred to in U.S. Patents 2,929,050 and 2,915,740.

FIG. 2a is in a way a repetition of a portion of FIG. 2 and illustrates the front view of one plane of the matrix. FIG. 2b is the corresponding end view, by showing a section taken through the plane of the cores A2 and A8. Finally, FIG. 2c is a corresponding plan view which also illustrates the control devices which operate between the adding section 7 and the matrix. These control devices are inhibiting generators JP, JQ, JR and JS which serve to control the reentering of a previously read out value or addition result.

When a stored value or information is to be read out from the storage matrix this is done by reading out that particular core located at an intersection in the matrix where half-current pulses 9a and 9c coincide. This means that if the particular core was positively saturated its magnetization is changed negatively up to saturation whereby an output signal is inductively generated in the read-out wire not illustrated. This output signal may be used after sufficient amplification by a read-out amplifier for introducing the respective information into the intermediate storage P1–S1. However if the particular magnet core was negatively saturated, thus carrying no information, no output signal is generated and no value is transmitted to the auxiliary storage. The reinsertion of values into the matrix is controlled by the impulses 9b, 9d and 9f. Also the impulses 9b and 9d are available for all four cores of one column of the matrix. However only those impulses 9b and 9d can be effective which are not voided or rendered ineffective by an inhibiting pulses 9f. The impulse 9f is controlled by the outputs of the adder P2–S2. The arrangement is such that an impulse 9f is available for that binary order position for which no information or value was present in the adder so that no value must be accordingly transmitted to the matrix. For instance, if element P2 contained information, the inhibiting generator JP is not triggered. Consequently only the two half-currents 9b and 9d appear at the particular matrix core and drive the latter into positive saturation whereby the respective information is inserted into the matrix. However, if the element P2 did not contain information, then the inhibiting generator JP is triggered so that the resulting impulse 9f voids the effect of one of the two half-currents and thus prevents the insertion of information into the particular matrix core.

Figure 2E:
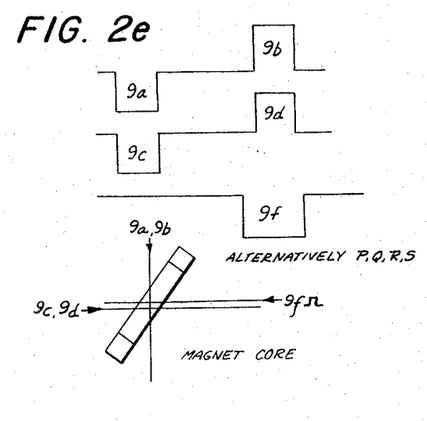

FIG. 2e diagrammatically illustrates the above.

Before proceeding with a description of the operation of the arrangement, some further details concerning the counting storage 10 will be given. In a manner described further below one digit of the second factor is read out at certain stages of the operation from the storage matrix 5 comprising the elements C1–C6. Of course, this decimal digit is represented by four binary bits which are taken from the four planes of the storage matrix 5. These four binary bits are transferred in parallel into the flip-flops P3, Q3, R3 and S3. Hereafter the repeated addition of the first factor is so controlled by the storage 10 that the tetrade 10 terminates such addition as soon as the stored digit value taken from storage 5 has been reduced to zero by substractive counting in the storage 10, the counting pulses being furnished by the last storage element B6 of storage 3 when the last or highest digit of the first factor has been processed, as is indicated by the dotted line in FIG. 1.

As mentioned above, multiplication is carried out as a repeated addition of the first factor. Consequently all the digits of the first factor are individually processed in the adding section 7 and the results are re-entered into the totalizer storage 1. Whenever all the digits of the first factor have been processed by one addition and thus the element B6 has been reached, a pulse is applied to the multiplier counter or counting storage 10 so as to reduce the multiplier digit stored therein by 1. Assuming that as a first digit of the multiplier the value 3 was stored in the storage 10, then after one addition of the digits B1–B6 of the first factor the stored value in the tetrade 10 would be reduced to 2. When in the counting tetrade 10 the value 0 is reached the multiplication with the first digit of the second factor is terminated and a decimal shift takes place as will be explained further below in reference to FIG. 4. After the decimal shift the second digit of the multiplier is transferred from the storage 5 to the tetrade 10 and the further additions of the first factor are carried out in a number corresponding to that second digit.

The operation of the two electronic switches $11_I$ and $11_{II}$ and the interaction of the remaining components of the arrangement will now be described with reference to FIGS. 3 and 4 and with respect to a simple calculation example.

First the sequence of operations is as follows:

(1) Stored value from A1 to adding section 7
Stored value from B1 to adding section 7
Sum A1+B1 is reentered into A1
(If in this addition a carry-over is produced, it remains stored in adding section 7 and is processed only when the next following digits are added)

(2) Stored value from A2 to adding section 7
Stored value from B2 to adding section 7
plus, if any, carry-over from the addition A1+B1
Sum A2+B2+U1 is reentered into A2 . . . and so on (6) Stored value from A6 to adding section 7
Stored value from B6 to adding section 7 (B6=0)
plus, if any, carry-over from the addition A5+B5
Sum A6+U5 is reentered into A6

In this manner the multiplication of a multiplicand with the multiplier digit 1 is carried out.

It should be noted that the register 2a (FIG. 2) as well as the registers 2, 4 and 6 (FIG. 3) are connected to a ring system i.e. the output of the last element is connected with the first element so that after the sixth shift step the first element is again activated for starting the shift cycles in the register 2a repeat as often as is required by the respective multiplier digit and as is determined by the action of the tetrade 10.

From the above it will be understood that it is necessary that the element or column B6 of the matrix 3 be a neutral stage storage the value 0 in order to make it possible that in the course of multiplications the last carry-over U5 stemming from an addition A5+B5 can be used for forming the sum A6—U5 and that this sum can be reentered into the totalizer 1.

The following calculation example will be used in explaining the operation:

$$044444 \times 123$$

In accordance with the above explanation the multiplication proceeds as follows:

First multiplication 044444×3

|  | A6 | A5 | A4 | A3 | A2 | A1 |  |
|---|---|---|---|---|---|---|---|
| From I | 0 | 0 | 0 | 0 | 0 | 0 | } to 7. |
| From 3 | +0 | 4 | 4 | 4 | 4 | 4 |  |
| From 7 into I | 0 | 4 | 4 | 4 | 4 | 4 |  |
| From I | 0 | 4 | 4 | 4 | 4 | 4 | } to 7. |
| From 3 | 0 | 4 | 4 | 4 | 4 | 4 |  |
| From 7 into I | 0 | 8 | 8 | 8 | 8 | 8 |  |
| From I | 0 | 8 | 8 | 8 | 8 | 8 | } to 7. |
| From 3 | +0 | 4 | 4 | 4 | 4 | 4 |  |
|  |  | 1 | 1 | 1 | 1 |  | Carry-overs. |
| From 7 into I | 1 | 3 | 3 | 3 | 3 | 2 |  |

Figure 4:
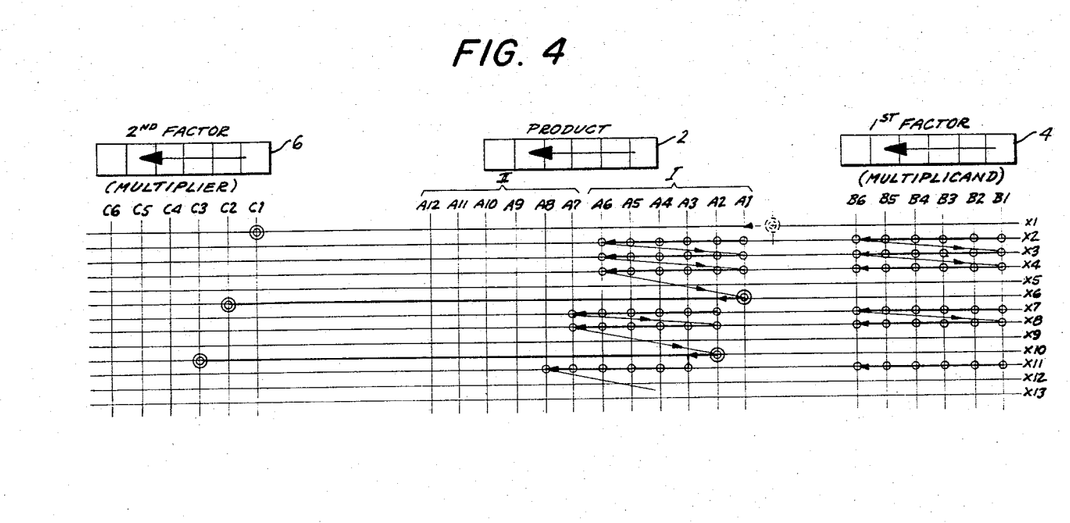
FIG. 4 is a time diagram illustrating the sequence of operation steps during a computation.

This procedure is illustrated by the row X2–X4 in FIG. 4.

In FIG. 4 the rows X1 to X13 are indicative of the consecutive operational steps in carrying out the multiplication. In this diagram, as can be seen, the step X1 concerns the reading out of the lowest order digit of the multiplier (C1) out of the storage 5, the steps X2–X4 represent the multiplication with second factor digit 3, step X6 concerns the decimal shift and the reading out of the second digit of the multiplier (C2) etc.

The impulse 9b derived from the last element of the register 2 and serving to cause reentry of a value from the adding section 7 into the column A6 additionally applies a pulse via a delay circuit 17 to a bistable flip-flop 8 (FIG. 3) whereby the latter is changed to its second stable condition. The flip-flop 8 controls the further above described electronic switches 11ᵢ and 11ᵢᵢ. When the condition of the flip-flop 8 is changed the switch 11ᵢ is rendered nonconductive and switch 11ᵢᵢ is rendered conductive so that now the partial storage matrix II comprising elements A7–A12 is placed in operative connection with the register 2a in such a manner that the first element of the latter would now be able to act on the column A7 while the last element of register 2a would act on column A12.

Hereafter, with a slight delay caused by a delay circuit 18, an impulse from the last element B6 of the register 4 is applied to the bistable flip-flop 8 whereby the latter is caused to return to its previous stable condition and whereby now the register 2a is again operatively connected with the partial storage I exactly as at the start of this calculating operation. The numerical value in the unit order of the multiplier i.e. the digit 3 is now processed to completion and when the value 3 stored in the tetrade 10 is reduced to 0 the resulting terminating impulse is transmitted from the tetrade 10 via line 13 to the register 6 whereby the latter is shifted one step i.e. from the first to the second element thereof. Now the multiplier digit 2 is read out and is transmitted to the tetrade 10. In addition a stepping impulse is applied via the same line 13 also to the register 2a whereby only the second register element thereof is activated so that the now following cycles of operation of the register 2a do not start with the first but with the second element thereof.

A control impulse generator G is provided which furnishes sequences of six control impulses whereby the shift generators 14 and 15 are triggered via line 12. The operation of this impulse generator G is terminated by the terminating impulse issued by the tetrade 10 so that thereafter the shift register 4 remains in idle condition.

Now the second multiplier digit is stored in the tetrade 10 as mentioned above and the impulse generator G is automatically restarted for furnishing a cycle of six control impulses. Thus another partial multiplication with the multiplier digit 2 is started. In this case the register 2a starts with its second element but the register 4 starts again with its first element under the action of read-out impulses 9a applied both to the registers or matrices 1 and 3.

The operation is as follows:

The totalizer 1 contains in its storage elements:

| A12 | A11 | A10 | A9 | A8 | A7 | A6 | A5 | A4 | A3 | A2 | A1 |
|---|---|---|---|---|---|---|---|---|---|---|---|
| 0 | 0 | 0 | 0 | 0 | 0 | 1 | 3 | 3 | 3 | 3 | 2 |
| From I |  |  |  |  |  | 0 | 1 | 3 | 3 | 3 | 3 | } to 7 |
| From 3 |  |  |  |  |  | 0 | 4 | 4 | 4 | 4 | 4 |  |
| From 7 into I and II |  |  |  |  |  | 0 | 5 | 7 | 7 | 7 | 7 |  |
| From I |  |  |  |  |  | 0 | 5 | 7 | 7 | 7 | 7 | to 7 |
| From 3 |  |  |  |  |  | 0 | 4 | 4 | 4 | 4 | 4 |  |
| From 7 into I and II |  |  |  |  |  | 1 | 0 | 2 | 2 | 2 | 1 |  |

This second partial multiplication is followed, as mentioned above, by a decimal shift and hereafter another partial multiplication with the multiplier digit 1 is carried out. The register 2a is now so set that it starts with its third element and acts on the partial totalizer storages I and II. However the register 4 starts again with its first element as above. The third stage of the multiplication develops as follows:

After the second partial multiplication the totalizer contains in its storage elements:

| A12 | A11 | A10 | A9 | A8 | A7 | A6 | A5 | A4 | A3 | A2 | A1 |
|---|---|---|---|---|---|---|---|---|---|---|---|
| 0 | 0 | 0 | 0 | 0 | 1 | 0 | 2 | 2 | 2 | 1 | 2 |
| From I and II |  |  |  |  | 0 | 1 | 0 | 2 | 2 | 2 |  | } to 7 |
| From 3 |  |  |  |  | 0 | 4 | 4 | 4 | 4 | 4 |  |  |
|  |  |  |  |  | 0 | 5 | 4 | 6 | 6 | 6 |  |  |

Consequently the result of the multiplication is now stored in the elements A1–A7 as the product 5 4 6 6 6 1 2

In case that in one element of the matrix 5 a 0 is stored and consequently after the transfer thereof into the tetrade 10 a 0 exists in the tetrade 10, no starting impulse is furnished by the tetrade 10 to the generator G. Consequently if a digit 0 of the multiplier is to be processed no partial multiplication is to be carried at all but only the decimal shift via driver 2 is carried out.

In the case of the present example the matrix 5 has the digits 123 stored in its elements C1–C3 so that 0-values are stored in the three higher order elements C4–C6. Consequently, these three further multiplier elements C4–C6 initiate each a decimal shift via the driver unit 2. The last impulse issued by the last element of the register 6 which is associated with the element C6 of the matrix 5 indicates to the operator that the multiplication is completed and that the product is available in the totalizer. Of course, this last impulse may be utilized advantageously for actuating a printing device for printing the product.

As has been intimated above, the above described arrangement will be operated always in such a manner that the multiplicand, although the components 3 and 4 are composed of six units each, has never more than five decimal orders because otherwise the twelve-order totalizer would not be able to store in certain cases the entire result. Similarly, the above given calculation example shows that the highest order element A12 of the totalizer 1 is not required for storing a digit. Instead this element may be used for indicating in the manner well known from calculating machines the positive or negative sign of the result. Therefore, it would be sufficient to equip the element A12 not with a matrix column containing e.g. 10 magnet cores but instead with a bi-stable flip-flop which by its one or other condition or position indicates whether the result is positive or negative. Such a sign-indicating flip-flop may be used for issuing control signals for the computer as referred to further below in the description of how to carry out a division.

Figure 3:
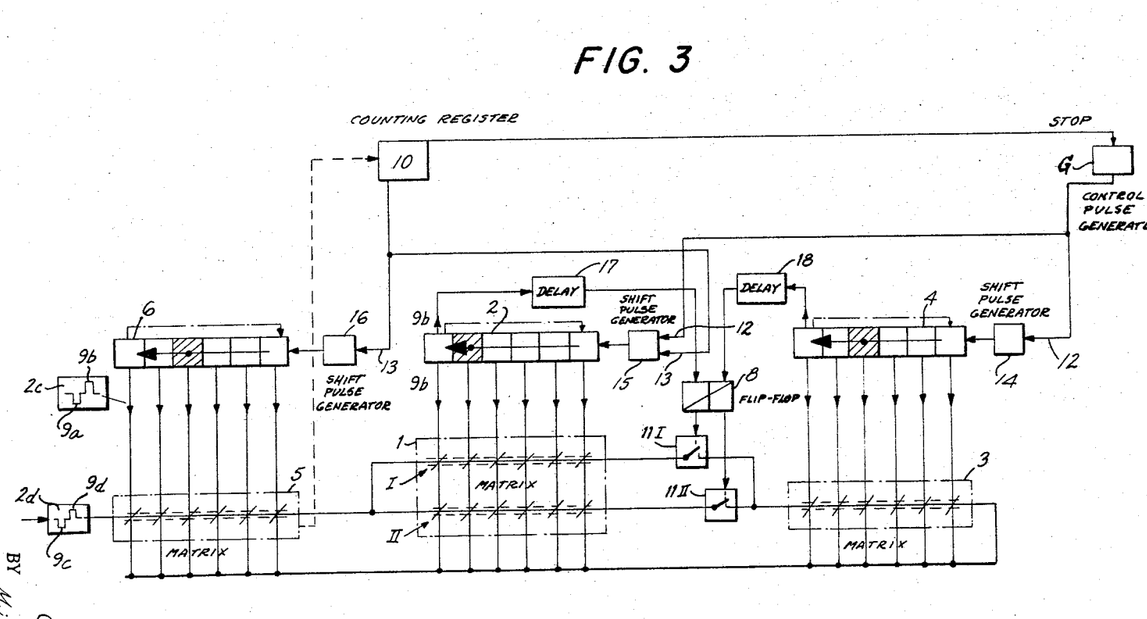
FIG. 3 is a diagrammatic illustration of a portion of the arrangement according to FIG. 1 illustrating the co-operation of the various components.
Figure 5:
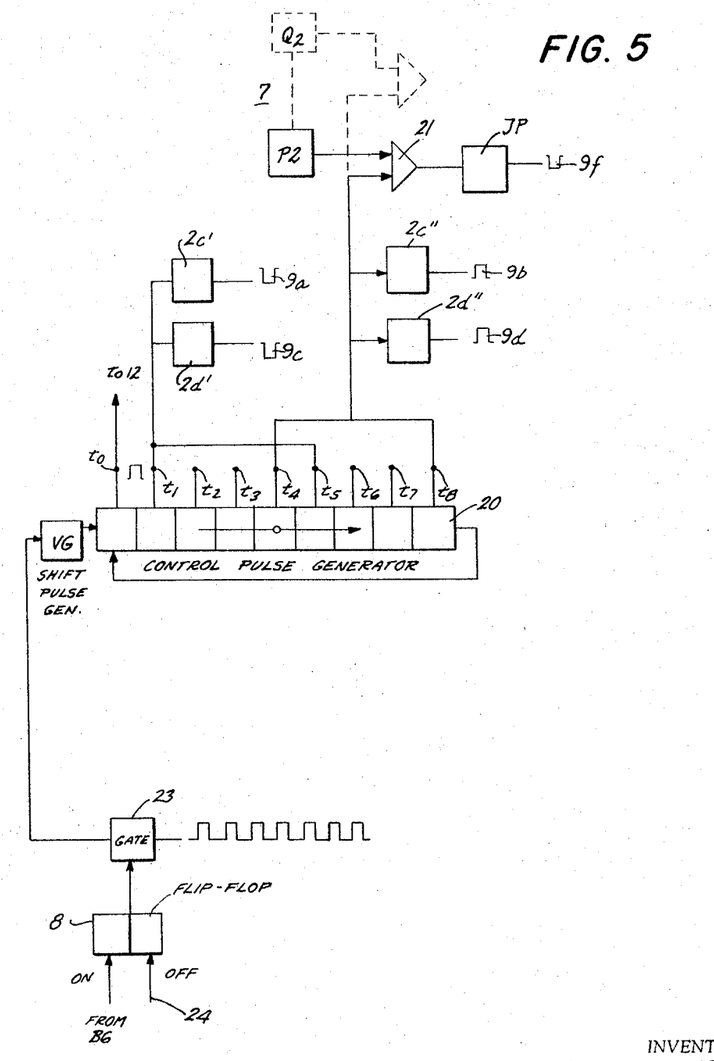
FIG. 5 is a block diagram illustrating an impulse generator controlling the sequence of operations of the arrangement according to FIG. 1.

In the above description referring to FIGS. 3 and 4 a control impulse generator G has been mentioned without being described in detail. FIG. 5 illustrates by way of example such an impulse generator arrangement and its cooperation with the other components of the arrangement. The generator according to FIG. 5 issues control impulses in consideration of two read-out and of two storing operations because in the adding section 7 always two digits $Ax$ and $Bx$ must be processed in connection with each other. As illustrated by FIG. 5, the timing control pulse generator may comprise a magnetic register 20 having a number of output windings terminating at the outputs $t_0$–$t_8$. The output pulses appear at these outputs sequentially progressing from left to right in accordance with the conventional shifting performance of such a register. One complete circulation of a bit of information through this register controls the complete processing of each single digit contained in the elements of the storages 1 and 3, the combination of such two digits in the form of an addition is carried out in the adding section 7 while finally the addition result is reentered into the totalizer matrix 1.

The significance of the control impulses furnished by the impulse generator register 20 is diversified as follows: the pulses at the outputs $t_1$ and $t_5$ are read-out pulses; the pulses at the outputs $t_4$ and $t_8$ are storing pulses. The other outputs are left open in order to provide for time intervals between the other pulses permitting operations to be carried out in the adding section 7. The first register element of the generator 20, having the output $t_0$, issues upon each operation cycle of the register 20 an impulse to the above mentioned lines 12 and thus triggers the shift generators 14 and 15 (FIG. 3).

The control pulse from output $t_1$ triggers the impulse generators $2c$ and $2d$ which are composed each of two individual generators $2c'$ and $2d'$, respectively, for furnishing negative pulses and of two individual generators $2c''$ and $2d''$, respectively, for furnishing positive pulses. The outputs $t_1$ and $t_5$ are connected with the generators $2c'$ and $2d'$ for initiating the two negative read-out pulses and the outputs $t_4$ and $t_8$ are connected with the generators $2c''$ and $2d''$, respectively, for initiating the two positive storing pulses. In addition, the pulses from outputs $t_4$ and $t_8$ are also applied to the inhibiting generators J mentioned above which issue the inhibiting pulses $9f$. Only one of the inhibiting pulse generators is shown namely JP associated with the adder stage P2. The generators J are controlled in addition by the adder of the adding section 7 via AND-circuits 21 whereby the impulses from the outputs $t_4$ and $t_8$ are guided to that one of the four generators JP–JS which has to be triggered in order to cause the respective digit to be stored at the right place.

In view of the fact that in the above example the matrices are basically of the 6-order type and controlled by 6-order drivers, the impulse generator 20 must carry out six operational cycles in order to cause an addition with six digits to be carried out. With every operational cycle and consequently with each pulse from output $t_0$ the registers 2 and 4 are shifted one step. When the sixth element is reached, a terminating pulse is derived from the element B6 (FIG. 1) which so actuates the flip-flop 8 that a gate 23 is closed. Consequently the operation of the register 20 which was up to this moment actuated by pulse sequences passing through the gate 23 is stopped. However, by application of a starting pulse via line 24 to the flip-flop 8 the entire operation can be restarted.

A division is carried out by means of the above described arrangement in a manner similar to the described multiplication. The dividend is stored first in the elements A1–A11 of the totalizer matrix 1. In the element A12 and in the respectively associated above mentioned sign-indicating flip-flop, respectively, the applicable sign is marked and the divisor is entered into the matrix 3. Repeated subtractions of this divisor from the applicable order positions of the dividend are carried out in the adding section 7 by addition of the complements of the respective numbers. The number of serial subtractions to be carried out is controlled by the last actuated (sixth) element of the driver 2 in conjunction with the adding section 7 and the element A12 of the totalizer 1 in a such manner that a result appearing in the section 7 during the processing of the digit in B6 and becoming negative causes the indicator element A12 to change to minus indication. This condition of A12 initates a correcting addition by which the element A12 is returned to plus indication. This switch is followed by a decimal shift to the right. The number of subtractions and the execution of said one correcting addition is counted by the tetrade 10. Whenever a decimal shift occurs the information stored in the tetrade 10 is transmitted to the matrix 5. Consequently, in the case of a division the matrix 5 handles the quotients.

In the case of divisions, the driver units 2 and 6 start operation from the highest order element thereof, which is in FIG. 3 the one located farthest to the left. In other words, in the case of a division the sixth element of units 2 and 6 is the starting element of each cycle. In the unit 6 that element is first activated which is associated and connected with the cores of the column C6 of the matrix 5.

The sixth element of the register $2a$ is, at the beginning of a division, connected with the element A6 of the totalizer 1, the first element of $2a$ is connected with A7, the second element with A8, etc. and finally the fifth element of $2a$ is connected with A11. This coordination is carried out like in the case of additions through the bistable flip-flop 8 and the associated electronic switches 11.

The decimal shift in direction toward the lower orders of the totalizer 1 is carried out by an impulse generator, not shown, which furnishes $n-1$ impulses (5 impulses in the present example) to the shift generators 15 and 16 (FIG. 3). As a result at the beginning of the second partial division the fifth element of the register $2a$ is starting element and the fifth element of the register 6 is connected with C5 of the matrix 5. The register 4 operates however exactly in the same manner as in the case of additions. It is only necessary to interpose between the matrix 3 and the adding section 7 a conventional converter device, not shown, which converts a digit read out from a column of matrix 3 into its complement digit and transmits the latter to the adding section 7.

The control impulses for the bistable flip-flop 8 are derived also in the case of a division from the last or highest order elements of the driver units 2 and 4, and all other steps take place in the manner described for additions. At the end of a division the quotient appears in the matrix 5 and if there is a remainder it will appear in the partial totalizer matrix I.

Finally it should be mentioned that instead of the electronic components described and illustrated, any equivalent components may be used. For instance, the entire driver unit 2 comprising the shift register $2a$, the electronic switches $2b$ and the bipolar generator $2c$ may be replaced by one magnetic shift register which furnishes analogous output currents for a core matrix. Similarly, the storage matrices 1, 3 and 5 may be replaced by other types of storages without departing from the spirit of the invention.

It will be understood that each of the elements described above, or two or more together, may also find a useful application in other types of electronic calculator differing from the types described above.

While the invention has been illustrated and described as embodied in an electronic calculator, computer means for serially carrying out line-by-line multiplications and divisions of numbers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electronic calculator, computer means including adder means for serially carrying out line-by-line multiplications and divisions of numbers, comprising, in combination, first factor storing means for storing one calculation factor; second factor storing means for storing a second calculation factor; totalizer storage means cooperating with said first and second factor storing means for carrying out multiplications and divisions, as the case may be, involving said one and said second factors, said totalizer storage means having a capacity for storing $n$ bits of information and being composed of a first and a second partial totalizer storage means each having $n/2$ storage elements for storing calculation results, said first partial totalizer storage means being assigned to the lower significance orders of said numbers, and said second partial totalizer storage means being assigned to the relatively higher significance orders of said numbers; first driver means for driving said first factor storing means; second driver means for driving said second factor storing means; third driver means for driving said totalizer storage means and having $n/2$ driver elements; bistable control means cooperating with said third driver means and said totalizer storage means for maintaining operative connection between said third driver means and said first partial totalizer storage means until the capacity thereof is exhausted, and for establishing, when the same is exhausted, operative connected between said third driver means and said second partial totalizer storage means; and control means cooperating with one of said factor storing means and with said bistable control means for causing the latter, every time when during operation said one factor is completely read out from said one factor storing means, to re-establish said operative connection between said third driver means and said first partial totalizer storage means.

2. A calculator as claimed in claim 1, wherein said first, second and third driver means are shift registers each comprising $n$ stages, and the driver means driving said one of said factor storing means and said third driver means, respectively, releasing said control pulses when the last stage of the respective shift register is activated.

3. A calculator as claimed in claim 1 wherein said first and second factor storing means and said totalizer storage means cooperate with said adder means in such a manner that in each of a number of sequential partial operations sums are formed of digital information stored in said first factor storing means and in said totalizer storage means, respectively, and each of said sums is stored in said totalizer storage means, the number of said partial operations being determined by the digital information stored in individual order positions in said second factor storing means, said sum formation and storage in said totalizer storage means being shifted one order position every time when the number of such partial operations has become equal to a digit value stored in one particular order position in said second factor storing means.

4. A calculator as claimed in claim 1, wherein each of said partial totalizer storing means and factor storing means is a magnetic core matrix.

5. In an electronic calculator, in combination, first factor storing means having $m$ storing sections, each for storing therein binary information representing a different decimal order digit of an $m$-order decimal number constituting a first factor; binary adder means for serially adding binary information representing individual order digits of decimal numbers; first driver means comprising shift register means having $m$ elements for causing, in response to an individual first shift impulse, transfer into said binary adder means of said binary information from said first factor storing means in order sequence, one order digit per shift impulse; second factor storing means having $o$ storing sections, each for storing therein binary information representing a different decimal order digit of an $o$-order decimal number constituting a second factor; counting register means for temporarily storing any binary information representing one of the digits stored in said second factor storing means and responding to a control pulse applied thereto by counting one decimal unit backward until the particular stored digit is reduced to zero and issuing thereupon a second shift impulse; second driver means comprising shift register means having $o$ elements for sequentially causing, in response to each of said second shift impulses, transfer of a decimal digit in a different storing section of said second factor storing means to said counting register means; means for transmitting to said counting register means one of said control pulses every time when information has been transferred from the highest order element of said first factor storing means to said binary adder means; totalizer storing means having $n$ storing sections and being composed of a first and a second partial totalizer storing means each having $n/2$ storage elements, each for storing therein binary information representing a different decimal order digit of a multi-order decimal number, said first partial totalizer storing means being assigned to the lower significance orders of said number, and said second partial totalizer storing means being assigned to the relatively higher significance orders thereof; third driver means comprising shift register means having $n/2$ elements for causing, in response also to said first shift impulse, transfer into said binary adder means of said binary information from said totalizer storing means in order sequence, one order digit per shift impulse; pulse generator means for sequentially applying said first shift impulses simultaneously to said first and third driver means; bistable control means cooperating with said totalizer storing means and with said first and third driver means for maintaining operative connection between said third driver means and said first partial totalizer storage means until the highest order element of said third driver means has been activated, and for establishing thereafter operative connection between said third driver means and said second partial totalizer storing means, but reestablishing said operative connection between said third driver means and said first partial totalizer storing means every time when information has been transferred from the highest order element of said first factor storing means to said binary adder means; said means for transferring from said binary adder means sequentially, order by order, to said totalizer storing means binary information representing the sum of the digits added by said binary adder.

6. A calculator as claimed in claim 5, including means for applying said second shift impulse also to said third driver means for shifting with every application of said second shift impulse the start of operation of the shift register of said third driver means one element forward.

7. A calculator as claimed in claim 5, wherein each of said shift registers of said driver means include a ring connection from the last to the first element thereof.

8. A calculator as claimed in claim 5, wherein the highest order storage element of said totalizer storing means is a bistable flip-flop one stable state whereof indicates a positive sign, while its other stable state indicates a negative sign applying to the number stored in the remaining elements of said totalizer storing means, and wherein for the purpose of carrying out a division said bistable flip-flop is operatively connected with said pulse generator means and wherein said binary adding means are set to carry out repeated subtractions by repeatedly adding the complement values of the respective digits, said bistable flip-flop causing said pulse generator means to apply, after each series of repeated subtractions, $n-1$ shift impulses to said shift registers of said second and third driver means so as to shift said shift registers one step toward the lower order positions of the number stored in said totalizer storing means.

9. A calculator as claimed in claim 8, wherein said bistable flip-flop is operatively connected with said binary adding means for being switched to its stable state indicating a negative sign, whenever the result of said repeated subtractions reaches a digit value below zero, in which case a single addition of the divisor is initiated.

10. A calculator as claimed in claim 9, wherein by said single addition said bistable flip-flop is returned to stable state indicating a positive sign whereby a shift of one step in direction toward lower order positions is effected, and wherein converter means are arranged between said first factor storing means and said binary adding means for transmitting real digit values stored in said first factor storing means to said binary adding means in the form of the respectively corresponding complement values.

11. A calculator as claimed in claim 8, wherein said counting register means are operatively connected with said second factor storing means in such a manner that said counting register means functions as revolution counter and transfers the digital value stored therein after the completion of each partial division operation to said second factor storing means.

References Cited by the Examiner
UNITED STATES PATENTS

| | | | |
|---|---|---|---|
| 3,192,363 | 6/1965 | MacSorley | 235—164 |
| 3,192,364 | 6/1965 | MacSorley | 235—164 |
| 3,192,365 | 6/1965 | Stewart | 235—164 |

OTHER REFERENCES

MacSorley O. L., High-Speed Arithmetic in Binary Computers, in Proceedings of the IRE 49(1), January 1961, p. 67–91.

MALCOLM A. MORRISON, *Primary Examiner.*

I. FAIBISCH, *Assistant Examiner.*